United States Patent
Matthews

(10) Patent No.: US 10,853,815 B2
(45) Date of Patent: *Dec. 1, 2020

(54) METHOD AND SYSTEM FOR AUTHORIZING CARD ACCOUNT TRANSACTIONS BY GEOGRAPHIC REGION

(71) Applicant: Capital One Services, LLC, McLean, VA (US)

(72) Inventor: Michele D. Matthews, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,754

(22) Filed: Feb. 24, 2020

(65) Prior Publication Data

US 2020/0193436 A1    Jun. 18, 2020

Related U.S. Application Data

(63) Continuation of application No. 15/955,065, filed on Apr. 17, 2018, now Pat. No. 10,614,464, which is a continuation of application No. 15/355,176, filed on Nov. 18, 2016, now Pat. No. 10,037,534, which is a continuation of application No. 14/505,574, filed on Oct. 3, 2014, now Pat. No. 9,530,138, which is a continuation of application No. 12/977,661, filed on Dec. 23, 2010, now Pat. No. 8,881,975, which is a continuation of application No. 12/031,446, filed on Feb. 14, 2008, now Pat. No. 7,857,212.

(51) Int. Cl.
G06Q 20/40 (2012.01)
G06Q 20/20 (2012.01)
G06Q 20/32 (2012.01)
G06Q 10/02 (2012.01)

(52) U.S. Cl.
CPC .......... G06Q 20/405 (2013.01); G06Q 10/02 (2013.01); G06Q 20/20 (2013.01); G06Q 20/3224 (2013.01); G06Q 20/40 (2013.01); G06Q 20/409 (2013.01)

(58) Field of Classification Search
CPC .. G06Q 20/405; G06Q 20/20; G06Q 20/3224; G06Q 20/40; G06Q 20/409; G06Q 10/02
See application file for complete search history.

(56) References Cited

U.S. PATENT DOCUMENTS 6,879,965 B2  4/2005  Fung et al.
7,552,088 B2  6/2009  Malcolm
(Continued)

*Primary Examiner* — Laura A Gudorf
(74) *Attorney, Agent, or Firm* — Troutman Pepper Hamilton Sanders LLP; Christopher J. Forstner; John A. Morrissett

(57) ABSTRACT

A method and system for authorizing card account transactions by geographic region by providing data for a user interface displaying geographic regions and merchant locations each corresponding to the location of a merchant where a transaction using a card account may be initiated, receiving a user interface selection representing a request to authorize or restrict card account transactions, receiving authorization requests for desired transactions, and authorizing or restricting the transactions in accordance with the request.

20 Claims, 7 Drawing Sheets

(56) References Cited

U.S. PATENT DOCUMENTS

| | | |
|---|---|---|
| 8,078,538 B1 | 12/2011 | Buch et al. |
| 2001/0032192 A1 | 10/2001 | Putta et al. |
| 2002/0169720 A1 | 11/2002 | Wilson et al. |
| 2003/0101137 A1* | 5/2003 | Wronski, Jr. .......... G06Q 20/00 705/44 |
| 2003/0200172 A1 | 10/2003 | Randle et al. |
| 2004/0153401 A1 | 8/2004 | Gila et al. |
| 2004/0185830 A1 | 9/2004 | Joao et al. |
| 2005/0086100 A1 | 4/2005 | Yanigisawa et al. |
| 2006/0041504 A1 | 2/2006 | Howard et al. |
| 2006/0215056 A1 | 9/2006 | Mitsuya et al. |
| 2007/0051797 A1 | 3/2007 | Randolph-Wall et al. |
| 2007/0055785 A1 | 3/2007 | Stevens |
| 2007/0057039 A1 | 3/2007 | Carlson et al. |
| 2007/0244633 A1 | 10/2007 | Phillips et al. |
| 2008/0021787 A1 | 1/2008 | Mackouse |

\* cited by examiner

FIG. 5

Authorization and Restriction Table 500

| | 1 | 2 | 3 | 4 |
|---|---|---|---|---|
| Entry Number | 1 | | | |
| Customer Name | John Doe | | | |
| Customer Address | 11 Main Street | | | |
| Customer Phone Number | (123) 456-7890 | | | |
| Customer E-mail Address | doe@email.com | | | |
| Customer Region Identifier | Region NA/1234 | | | |
| Account Type | Credit (Rate Level 3) | | | |
| Account Number | 1234 1234 1234 1234 | | | |
| Expiration Date | 9/1/09 | | | |
| Card Association | ABC Issuer (000001) | | | |
| Status | Restricted | | | |
| Region Identifier | | | | |
| Merchant Identifier | 56785678 (XYZ Store) | | | |
| Begin Time | 1/1/08 9:00 AM | | | |
| End Time | 1/1/09 9:00 AM | | | |
| Instructions | All transactions | | | |

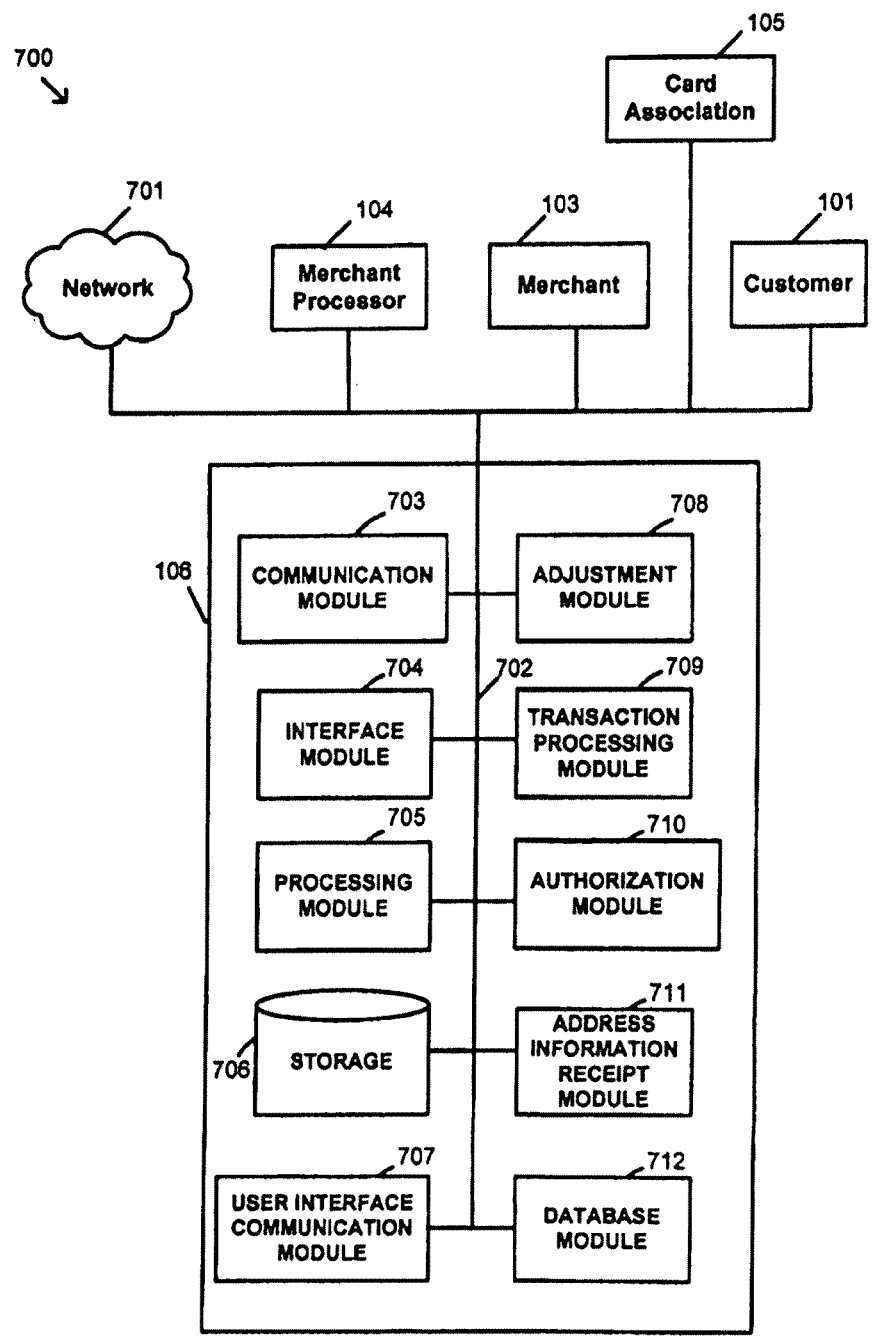

METHOD AND SYSTEM FOR AUTHORIZING CARD ACCOUNT TRANSACTIONS BY GEOGRAPHIC REGION

CROSS REFERENCE TO RELATED APPLICATIONS

This application is a continuation of, and claims priority under 35 U.S.C. § 120 to, U.S. patent application Ser. No. 15/955,065, filed Apr. 17, 2018, which is a continuation of U.S. patent application Ser. No. 15/355,176, filed Nov. 18, 2016, now U.S. Pat. No. 10,037,534, which is a continuation of U.S. patent application Ser. No. 14/505,574, filed Oct. 3, 2014, now U.S. Pat. No. 9,530,138, which is a continuation of U.S. patent application Ser. No. 12/977,661, filed Dec. 23, 2010, now U.S. Pat. No. 8,881,975, which is a continuation of U.S. patent application Ser. No. 12/031,446, filed Feb. 14, 2008, now U.S. Pat. No. 7,857,212, then entire contents of each of which are fully incorporated herein by reference in their entireties.

FIELD OF THE INVENTION

The present invention relates to a method and system for authorizing card account transactions by geographic region.

BACKGROUND OF THE INVENTION

Identity theft and data breach are significant concerns for many customers, particularly those who use credit cards regularly and those who engage in online transactions. Customers need confidence that their card accounts will not be fraudulently used without their permission, but often lack direct control over exactly how and when their card accounts may be used. For example, a customer may know that he or she will never travel to a particular foreign country and therefore want his or her card to be restricted from use in that country, but lack the capability to do so. Conversely, a customer may have upcoming plans to travel to a specific foreign country and need to only authorize use of his or her card for that limited period of time. Customers may also want to allow or prohibit transactions involving specific merchants. For example, a customer may have a moral or ethical objection to patronizing certain businesses. A customer may also know that he or she will never spend a large sum of money at a particular merchant such that transactions over that limit would ideally be rejected. There may exist many other situations as well where a customer might want to limit transactions in particular geographic regions and merchant locations but lack the capability to do so.

These and other drawbacks exist with current systems.

SUMMARY OF THE INVENTION

Various exemplary embodiments provide for authorizing card account transactions by geographic region. A customer may establish one or more accounts with a particular card issuer and receive an associated card, such as a credit card, that the customer may use to make purchases or perform other financial transactions. The customer may desire to prevent others who might come into possession of the customer's card or card number from fraudulently making purchases on his or her account. To do so, the card issuer (or any other entity involved in handling and/or processing transactions) may allow the customer to selectively choose through an interactive user interface the geographic regions and merchant locations which the customer desires to authorize or restrict. In that way, the customer may prevent unauthorized use of his or her account and realize an added level of account security.

Various exemplary embodiments may provide a method for authorizing card account transactions by geographic region. Data may be provided for a user interface displaying a plurality of geographic regions and merchant locations where a transaction using the customer's account potentially may be performed. A user interface selection may then be received representing a request to authorize or restrict particular transactions. During the authorization or settlement phase of a later transaction, it may be determined whether to allow or deny the transaction by, for example, comparing the geographic region and identification of the merchant that submitted the authorization request to a database of authorization and restriction entries for the customer's account. If there is no applicable restriction, or the customer has specifically authorized the transaction, the transaction may be allowed. If not, the transaction may be denied.

Various exemplary embodiments may also provide a system for authorizing card account transactions by geographic region, including an interface module for providing data for a user interface that may allow the customer to selectively choose geographic regions and merchant locations. The system may also include a user interface communication module to receive a user interface selection, as well as a transaction processing module and an authorization module for acting on subsequent authorization requests for attempted transactions.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 5 depicts an exemplary database table for use in authorizing card account transactions by geographic region according to various embodiments of the disclosure;

FIG. 7 depicts an exemplary system for authorizing card account transactions by geographic region according to various embodiments of the disclosure.

DETAILED DESCRIPTION OF EXEMPLARY EMBODIMENT(S)

The following description is intended to convey a thorough understanding of the embodiments described by providing a number of specific embodiments and details involving systems and methods for providing credit to a customer based on the customer's preliminary use of an account. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for authorizing card account transactions by geographic region. As used herein, a geographic region may include, for example, any area, region, locality, or physical zone at any level, including, for example, a street, neighborhood, zip code, county, state, province, country, or continent.

Figure 1:
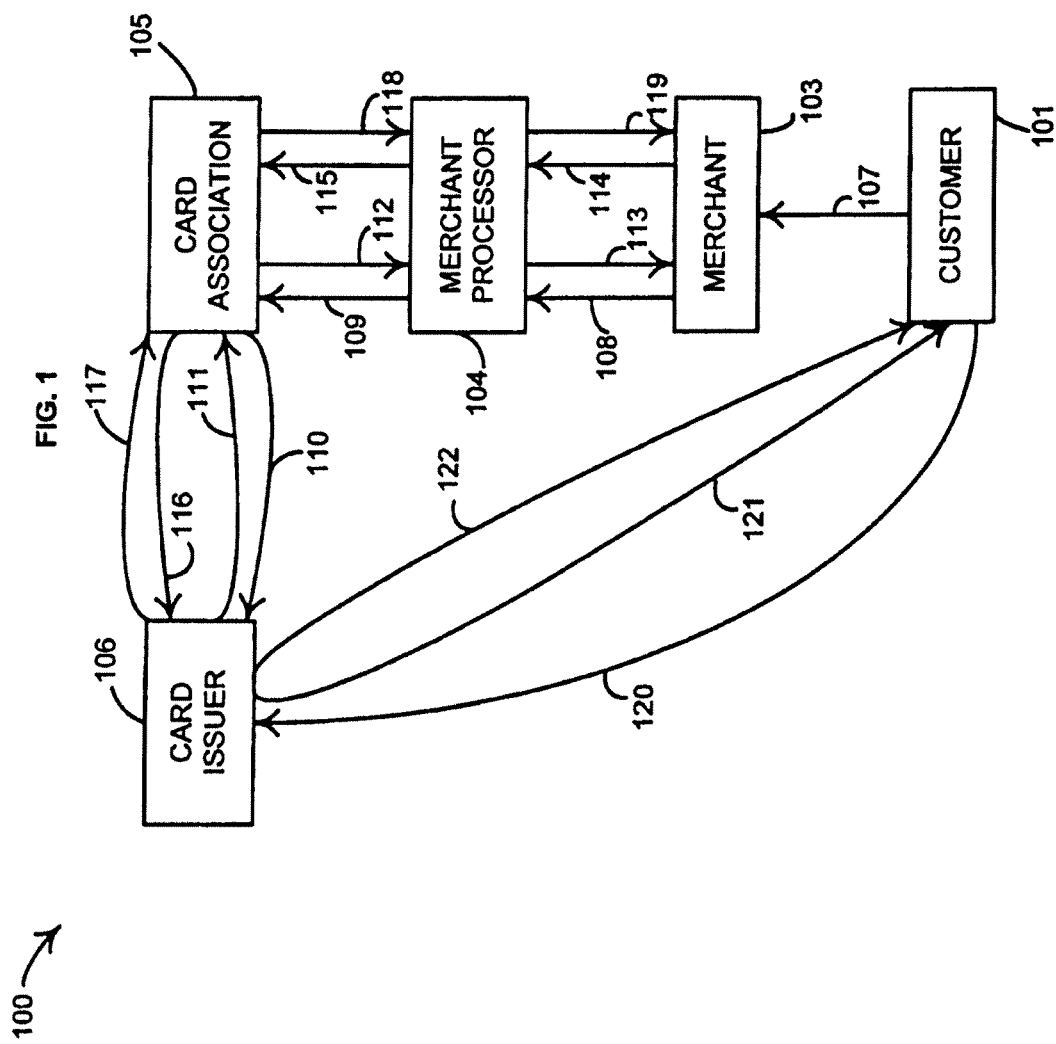
FIG. 1 depicts an exemplary embodiment of a system for authorizing card account transactions by geographic region according to various embodiments of the disclosure.

FIG. 1 depicts an exemplary embodiment of a system 100 for authorizing card account transactions by geographic region according to various embodiments of the disclosure. System 100 may involve a customer 101, a merchant 103, a merchant processor 104, a card association 105, and/or a card issuer 106.

System 100 may include one or more network-enabled computers to process instructions for authorizing card account transactions by geographic region. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of system 100 may execute one or more software applications to, for example, receive data as input from an entity accessing the network-enabled computer, process received data, transmit data over a network, and receive data over a network. The one or more network-enabled computers may also include one or more software applications to enable the processing of a card transaction.

The components depicted in FIG. 1 may be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In various exemplary embodiments, the network may include one, or any number of the exemplary types of networks mentioned above, operating as a stand alone network or in cooperation with each other. Use of the term network herein is not intended to limit the network to a single network. The components depicted in FIG. 1 may communicate by electronic transmission through the one or more networks mentioned above, by physical delivery, or by any other communication mechanism. Communication between two components depicted in FIG. 1 may also include communication with any other entities between the two components.

In various exemplary embodiments, customer 101 may be any individual or entity that has an account with card issuer 106 or desires to have an account with card issuer 106. As used herein, the term account may include any place, location, object, entity, or other mechanism for holding money or performing monetary transactions in any form, including, without limitation, electronic form. An account may be, for example, a prepaid card account, stored value card account, debit card account, check card account, payroll card account, gift card account, prepaid credit card account, charge card account, checking account, rewards account, line of credit account, or credit account. Card issuer 106 may be, for example, a bank, other type of financial institution, or any other entity that offers accounts to customers.

Customer 101 may also desire to conduct financial transactions with one or more merchants using his or her account with card issuer 106. For example, customer 101 may desire to purchase goods or services from a merchant. To do so, customer 101 may use a unique account identifier associated with the customer's account, which may be any sequence of letters, numbers, characters, or symbols of any length and may be associated with a payment mechanism, including, without limitation, a credit card, debit card, smart card, charge card, or any other mechanism for making payment. The payment mechanism may be issued to customer 101 by card issuer 106. For example, customer 101 may be issued a credit card that allows customer 101 to make purchases on credit up to a specified dollar limit and repay card issuer 106 for those purchases over time by making monthly payments. Card issuer 106 may pay for the purchases of customer 101 at the time of purchase on behalf of customer 101 and charge customer 101 interest for using its credit services. Also, customer 101 may use a charge card wherein the balance of the customer's card may be paid off monthly. Also, customer 101 may use a debit card wherein amounts for the purchases may be electronically debited from a checking or other account held by customer 101 at card issuer 106.

Card issuer 106 (or any other entity depicted in FIG. 1) may store the account identifier associated with the customer's account, along with any other information associated with customer 101, his or her account(s), or financial transactions involving the account(s), in an electronic storage medium. It is well-known in the art that electronic files and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The account identifier of the customer's account may also be associated with card association 105, which may administer cards and act as a gateway between card issuer 106 and a merchant from which customer 101 desires to make a purchase for processing card transactions. Exemplary card associations may include, without limitation, Visa®, MasterCard®, American Express®, and Discover®.

Merchant 103 may be any entity capable of accepting an account identifier as payment. Merchant 103 may receive payments for the merchant's card transactions in various ways, such as a bank account held by merchant 103. For example, merchant 103 may establish a direct deposit account or checking account at a bank. Also, merchant processor 104 may process transactions on behalf of merchant 103.

In various exemplary embodiments, customer 101 may begin by establishing an account with card issuer 106. Customer 101 may establish a credit account with a particular account number and receive a corresponding Visa® credit card displaying that number, which he or she may then use to make purchases on credit. It will be recognized, however, that any type of account, card, or identifier may be used, as described herein.

Upon establishing the account, customer 101 may use the associated account identifier and/or card to purchase goods and services from, or conduct any other type of financial transaction with, any merchant in any geographic region. This may be the "default" setting for new accounts with card issuer 106. To make a purchase, customer 101 may, for example and without limitation, swipe his or her credit card in person at the location of a merchant using a register, card payment terminal, or point of sale (POS) system, which may read the account identifier from the magnetic stripe on the card. Also, the account identifier may be provided via a bar code on the card. Also, the account identifier may be provided via radio-frequency identification (RFID) or other automatic identification mechanisms. Various mechanisms for accepting an account identifier as payment will be recognized by those skilled in the art, including, for example, transaction processing equipment and software provided by, for example, VeriFone, Inc. of San Jose, Calif. Also, customer 101 may provide a merchant with the account identifier over the telephone or using a computer. For example, customer 101 may make a purchase electronically by entering his or her account identifier and/or other information associated with the desired purchase on the World Wide Web (WWW) site of a merchant, a site accessible via a network, or any other site accessible by a communication mechanism. Various mechanisms for conducting online transactions will be recognized by those skilled in the art. Customer 101 may also make a purchase electronically using various payment services, such as, for example, PayPa10.

Customer 101, however, may for various reasons desire to allow only certain transactions with his or her account, such as transactions with particular merchants or transactions in a particular geographic region. It will be understood that there may be many reasons why customer 101 may desire to have only certain transactions authorized. For example, if customer 101 knows that he or she will never travel to a particular country or state, customer 101 may desire to prohibit charges in that region and thereby prevent criminals from fraudulently using his or her card there. Conversely, if customer 101 desires to travel to a particular foreign country or city (e.g., Costa Rica, London), customer 101 may desire to specifically authorize transactions in that region for a set period of time to ensure that he or she can use the card without problems while traveling abroad. Also, customer 101 may have recently noticed a false charge on his or her account statement that was made in an unusual location (for example, after being notified of the unusual charge by card issuer 106) and may want to prevent similar charges from occurring in the future. Customer 101 may likewise desire to authorize only transactions with certain merchants or at certain merchant locations. For example, customer 101 may periodically allow his or her child to charge items with the customer's card, or may hold the account on behalf of a child, and desire to prevent transactions with merchants deemed unsuitable for minors (e.g., merchants that sell alcohol or tobacco). Also, if customer 101 knows that he or she will never spend more than $1000 at a particular retail store location (e.g., the Wal-Mart® store on Main Street), he or she may want to prohibit transactions over $1000 at that merchant location. Authorizing only transactions that customer 101 permits in advance, while restricting others, may be an efficient and accurate way of preventing identity theft and give customers an added sense of security when using a card for everyday purchases.

In various exemplary embodiments, customer 101 may provide information to card issuer 106 to authorize certain transactions and prohibit others, as described herein. For example, customer 101 may communicate with card issuer 106 by telephone via a Voice Response Unit ("VRU"), by mail, by electronic transmission at a retail location, by electronic transmission from a wireless/mobile device, or by electronic transmission from a personal computer. Customer 101 may also execute a web browser program on a computer to connect to a server of card issuer 106 (e.g., via the Internet) and request the Uniform Resource Locator (URL) of a web page from the server. The server may receive the customer's request, process the request, retrieve or create the requested web page, and transmit the requested web page to the computer of customer 101. The customer's web browser program may then receive the web page and render it on the customer's computer screen. Customer 101 may interact with the web page by, for example, clicking on buttons or activating links associated with the web page or entering information with a keyboard. The web browser may interpret this interaction and send information to the server for authorizing only certain transactions as instructed by customer 101. Examples of commercial web browser programs suitable for this purpose are Internet Explorer available from Microsoft( ) Corporation, Netscape Navigator available from Netscape® Communications, Safari( ) available from Apple®, Inc., and Firefox® available from Mozilla Corporation. The web pages described above may be, for example, HTML (Hypertext Markup Language), XML (Extensible Markup Language), ASP (Active Server Page), Java, Javascript, XHTML (Extensible HyperText Markup Language), or Ajax (Asynchronous JavaScript and XML) files, or any other file format that allows web pages or portions of web pages to be rendered in a web browser. It will be recognized by those skilled in the art that various tools are readily available to create and render web pages.

As described in greater detail below, customer 101 and card issuer 106 may interact via an interactive user interface provided by, for example, card issuer 106. Card issuer 106 may retrieve data from an electronic storage medium to build a user interface for customer 101 based on an account identifier provided by the customer. In various exemplary embodiments, the data may include information regarding customer 101 and his or her account (e.g., name, address, phone number, account type, account number, card type, expiration date, card association), information regarding any previous authorizations or restrictions requested by customer 101, as well as any type of web page functionality (e.g., images, text boxes, radio buttons, icons, drop-down menus) to render a web page as a user interface. The data may also include any parameters set by customer 101 for customizing his or her own user interface.

The data used to build the user interface may also include information regarding merchants, merchant locations (e.g., names, addresses, phone numbers, location codes), and cartographic information (e.g., city names, street names, map images). In various exemplary embodiments, card issuer 106 may receive a list of all merchants where it is possible for a transaction to be initiated using the customer's account. For example, card issuer 106 may receive a list of all merchants authorized to accept Visa® credit cards from Visa® or from any other entity with access to such information, such as a merchant processor or merchants themselves. The list may include the identification of merchants as well as addresses for particular locations of those merchants (e.g., Wal-Mart® and individual Wal-Mart® store addresses). Because such data may be voluminous, card issuer 106 may receive the data in portions over time (e.g., by geographic region) or as necessary (e.g., through as-needed requests to a card association) or whenever data for a particular merchant or merchant location changes. Card issuer 106 may then populate a database or data warehouse, for example, with entries for all potential merchants and merchant locations. Also, card issuer 106 may store incoming data for a merchant or merchant location whenever a transaction is submitted for authorization or settlement, as described in further detail below. For example, a merchant's name and address may be included in a typical authorization request. Card issuer 106, in addition to assessing the request to determine whether to authorize the transaction, may copy the incoming information. In that way, whenever a transaction is attempted with the customer's account, card issuer 106 may recognize another merchant and/or merchant location and add it to a growing list for later use, as described herein.

Cartographic information may also be received and stored by card issuer 106, which may then execute processes to correlate addresses in the merchant information to locations and map images in the cartographic information. For example, an address of "11 Main Street" for a particular merchant may have an association in a database with various map images of the country, state, county, zip code, and/or neighborhood where 11 Main Street is located, as well as a pinpoint location within those images for the address. It will be recognized by those of skill in the art that because street names and other address information are not always uniformly written (e.g., "11 Main Street," "11 Main St."), various processes may be conducted to parse or filter the data and make the necessary associations. Also, the cartographic information may be received from any provider of such information and may be received electronically or in written form and scanned into an electronic storage mechanism.

Figure 2:
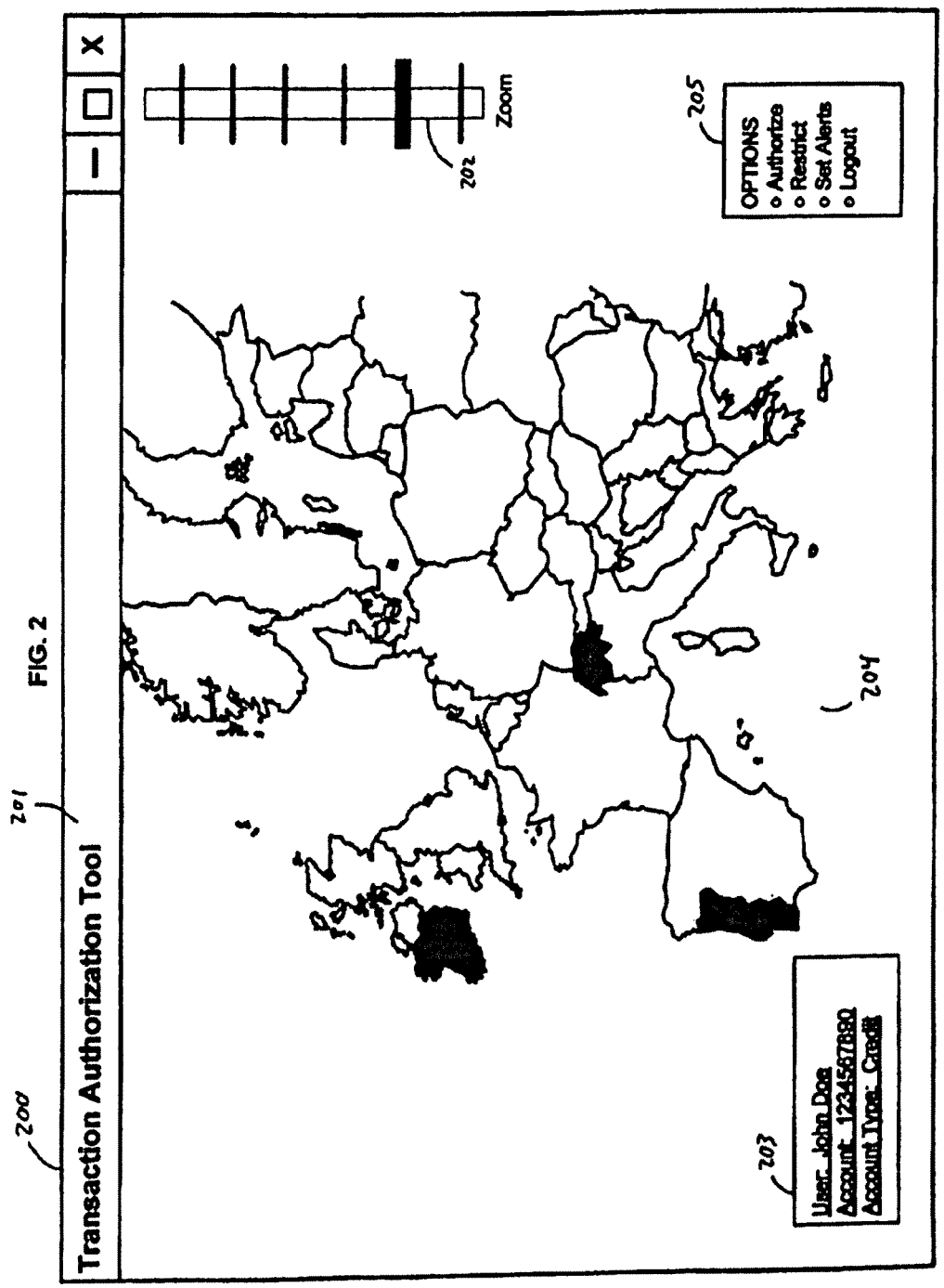
FIG. 2 depicts an exemplary user interface for authorizing card account transactions by geographic region according to various embodiments of the disclosure.
Figure 3:
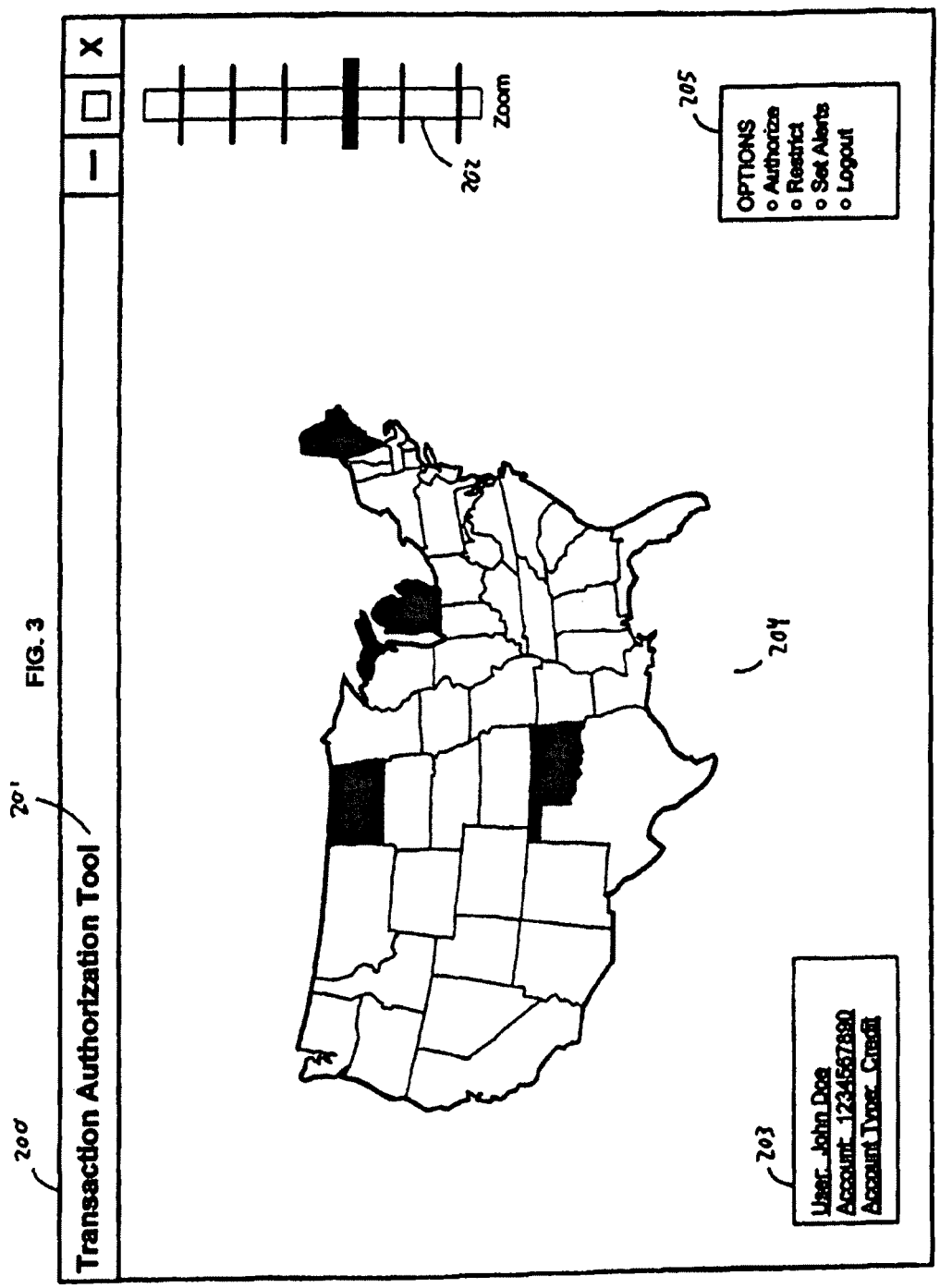
FIG. 3 depicts an exemplary user interface for authorizing card account transactions by geographic region according to various embodiments of the disclosure.
Figure 4:
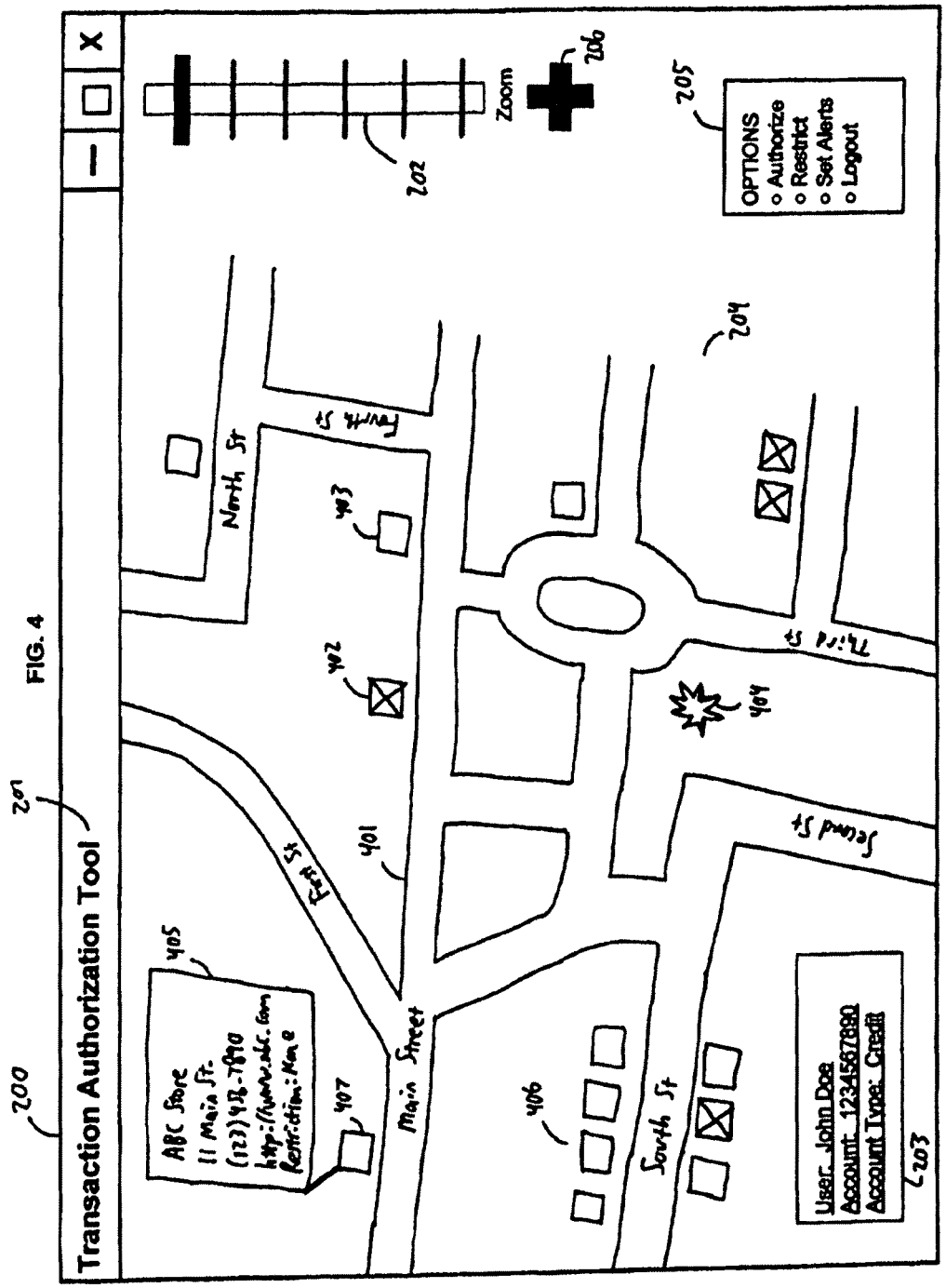
FIG. 4 depicts an exemplary user interface for authorizing card account transactions by geographic region according to various embodiments of the disclosure.

Card issuer 106 may then generate the user interface based on the retrieved information and provide it to customer 101, as indicated by arrow 121 in FIG. 1. For example, card issuer 106 may transmit web page data to the customer's web browser for display on the customer's computer screen. Also, card issuer 106 may display a user interface on a terminal screen at a branch location operated by card issuer 106, on a wireless/mobile device, or on an Automated Teller Machine ("ATM"). Also, the card issuer 106 may display a user interface on a computer screen shown to an employee of the card issuer 106 who may assist a customer in establishing authorizations and restrictions over the telephone. The user interface may include functionality for customer 101 to authorize transactions by geographic region, as shown in FIGS. 2-4 and discussed in greater detail below.

Using the user interface, customer 101 may provide information to card issuer 106 requesting that only certain transactions be authorized, as indicated by arrow 120. In various exemplary embodiments, the request may comprise a geographic region, merchant, or merchant location selected using the user interface. For example, customer 101 may instruct card issuer 106 that future transactions in a particular geographic region should not be allowed by selecting that region in the user interface. Also, customer 101 may instruct card issuer 106 that transactions involving a particular merchant or transactions at a particular merchant location should not be authorized by making corresponding selections in the user interface.

The customer's request may also comprise parameters for the authorization and restriction of transactions. For example, customer 101 may provide a time and date to begin authorizing and restricting transactions (e.g., an effective date), a time and date to end authorizing and restricting transactions (e.g., a termination date), dates for when transactions should be authorized or restricted (e.g., transactions occurring on the last day of each month), a list of what types of transactions should be authorized or restricted (e.g., purchases, charges, cash advances, withdrawals, cash withdrawals at an ATM, loans, payments, bill payments, debits, credits, deposits, or direct deposits), amounts of transactions that should be authorized or restricted (e.g., all transactions over $1000, all transactions between $100 and $500), or specific cards to which the authorization or restriction should apply (e.g., if multiple cards are associated with a particular account identifier, such as in the case where a family has multiple cards for the same account). As indicated by arrow 122, card issuer 106 may in response provide to customer 101 (e.g., by web page, by text message, by mail) an acknowledgement that transactions will be authorized and restricted in the requested manner in the future, or may request any further information necessary for complying with the customer's request. Card issuer 106 may also ensure the customer's security by, for example, requiring customer 101 to authenticate himself or herself (e.g., with a username and password) or sign a written document prior to implementing a request.

It will be recognized that the information provided by customer 101 may comprise either, or both of, a request to authorize particular transactions or a request to restrict particular transactions. Card issuer 106 may present a "default" setting whereby transactions in all geographic regions and with all merchants and all merchant locations are initially allowed; the status of these geographic regions, merchants, and merchant locations may be designated, for example, as "allowed." Customer 101 may then modify those settings by requesting various restrictions over time; their status may then be changed to "restricted." Also, card issuer 106 may present the opposite "default" setting for customers who are particularly concerned about security. In that case, the "default" setting may be for all transactions to be "restricted" and the customer may then authorize some transactions by changing their status to "allowed," as described herein.

It will also be understood that the requested authorization and restriction need not be performed by card issuer 106 and may be performed by any other entity involved in handling and/or processing financial transactions, including card association 105, merchant processor 104, or merchant 103 depicted in FIG. 1. In those cases, customer 101 (and/or card issuer 106) may provide information for performing the requested authorization and restriction, as described herein, to that respective entity so that the entity can act in accordance with the customer's request or pass along information to yet another entity that may act on the customer's request.

Once a request for authorization or restriction is received, card issuer 106 may use that information to authorize and restrict particular transactions as they occur. For example, when an attempted transaction is initiated using the customer's account identifier and/or card, such as a purchase of goods or services from merchant 103, the transaction may need to be authorized by various entities and payment made for the transaction, as described in further detail below. It will be recognized by those skilled in the art that in at least some exemplary financial transactions (e.g., credit card transactions), there may be at least two phases: authorization and settlement. In the authorization phase, a merchant may perform various actions to find out whether a customer's desired transaction is valid (e.g., if the customer has sufficient funds in his or her account or sufficient credit available to make a particular purchase). If the transaction is valid, the merchant may receive payment for the transaction in the settlement phase (e.g., from the customer's card issuer). Each phase will be discussed in reference to Figure Authorization Phase: As indicated by arrow 107, customer 101 may provide merchant 103 with his or her account identifier (e.g., by swiping a credit card) to purchase desired goods or services or conduct another type of financial transaction with merchant 103. After receiving the account identifier from customer 101, merchant 103 may begin the process of attempting to authorize the desired transaction by providing an authorization request to merchant processor 104, as indicated by arrow 108. The authorization request may include, for example, information associated with the amount of the desired transaction, the account identifier used for the transaction, information associated with requesting merchant 103 (e.g., a merchant identifier, address, phone number), and/or any other information associated with customer 101, merchant 103, or transaction. In various exemplary embodiments, merchant 103 may transmit the authorization request to merchant processor 104 electronically over one or more networks.

In various exemplary embodiments, merchant processor 104 may have a predefined relationship, agreement, or arrangement with merchant 103 to authorize and settle card transactions on behalf of merchant 103. Merchant processor 104 may process transactions for a plurality of merchants and a plurality of customers. For example, TSYS Acquiring Solutions, LLC (TSYS), which those skilled in the art will recognize as an entity that authorizes and settles card transactions, may operate as merchant processor 104.

As indicated by arrow 109, merchant processor 104 may provide the authorization request, or any other authorization data, to card association 105 associated with the account identifier of customer 101. For example, if customer 101 attempted to pay for a purchase with a Visa® credit card, the authorization request may be routed to Visa®. If customer 101 attempted to pay for a purchase with a MasterCard® credit card, the authorization request may be routed to MasterCard®. Card association 105 may perform various actions to verify that the desired transaction may be completed, including, for example, verifying that there may not have been a temporary or permanent hold placed on the card or verifying that one or more predetermined fraud parameters may not have been triggered. For example, card association 105 may verify that the amount of the desired transaction is not unusually large based on the customer's recent purchases.

As indicated by arrow 110, card association 105 may provide the authorization request, or any other authorization data, such as, for example, information associated with verification of customer 101 or transaction, as described herein, to card issuer 106 that issued the card to customer 101. For example, if customer 101 obtained his or her card from a bank, that bank may act as card issuer 106. Card issuer 106 may perform various actions to verify that the desired transaction may be completed, including, for example, verifying that the account identifier is valid and/or verifying that the desired purchase is within the credit or debit limit available to customer 101.

Card issuer 106 may also determine whether customer 101 has requested any authorizations or restrictions that might apply to the pending transaction. The process may involve searching a database table for authorizations and restrictions requested by customer 101, as described herein and in reference to FIG. 5. For example, card issuer 106 may extract the address of merchant 103 from the received authorization data, determine a set of geographic regions associated with the address (e.g., street, neighborhood, zip code, county, state, province, country, continent), and determine whether any of those geographic regions are restricted for the account of customer 101 (e.g., a city may be restricted, but the state in which it is a part may not be). Card issuer 106 may also extract the name of merchant 103, or a merchant identifier (e.g., a sequence of letters, numbers, characters, or symbols of any length) associated with merchant 103, from the received authorization request and determine whether merchant 103 or the location of merchant 103 is restricted for the customer's account. Card issuer 106 may also conduct further processing to compare the desired transaction (e.g., amount, date) to any parameters associated with the authorizations or restrictions (e.g., maximum amount, designated time period).

Card issuer 106 may then create an authorization message approving or denying the transaction. If customer 101 has not requested any restriction that would apply to the pending transaction, or has requested an authorization that would apply to the pending transaction, the transaction may be approved. If, however, customer 101 has requested a restriction that would apply to the pending transaction, the transaction may be denied. The fact that a transaction was attempted but denied as restricted may indicate potential fraudulent use of the customer's account, in which case card issuer 106 may alert customer 101, merchant 103 (who may question the individual attempting to make the transaction at the point-of-sale), or appropriate law enforcement authorities or other entities. If, for example, customer 101 is the individual attempting to conduct the transaction, customer 101 may override the restriction in various ways (e.g., telephone call to a call center, text message with password) to verify his or her identity and complete the transaction. The authorization message provided by card issuer 106 may eventually be routed back to merchant 103, as described herein.

As indicated by arrow 111, card issuer 106 may provide the authorization message to card association 105. As indicated by arrow 112, card association 105 may provide the authorization message, or any other authorization data, to merchant processor 104. In various exemplary embodiments, an entity may operate as both card association 105 and card issuer 106. Merchant processor 104 in that situation may route the authorization request to the combined entity and the combined entity may provide the authorization message to merchant processor 104. Also, card association 105 itself may operate as card issuer 106, as described herein. Merchant processor 104 in that situation may route the authorization request to card association 105 and card association 105 may determine whether any applicable authorizations or restrictions have been established and provide the authorization message to merchant processor 104.

As indicated by arrow 113, merchant processor 104 may provide the authorization message, or any other authorization data, to merchant 103. If the transaction was denied, merchant 103 may deny the desired transaction and, for example, refuse to provide customer 101 with his or her desired goods or services. If the transaction was approved, merchant 103 may complete the transaction by, for example, receiving the customer's written signature on a receipt, providing the desired goods or services to customer 101, and/or storing information associated with the transaction for later settlement. For example, merchant 103 may store information electronically in a batch file or other storage mechanism.

Settlement Phase: During the settlement phase, merchant 103 may receive payment for one or more card transactions, such as purchases of goods and services that merchant 103 provided to its customers. In various exemplary embodiments, merchant 103 may accumulate transactions until a predetermined threshold has been reached, such as, for example, a predetermined total amount or predetermined period of time (e.g., at the end of each business day), before proceeding with settlement. Merchant 103 may store information associated with each transaction in one or more batch files for later settlement at the predetermined time.

Merchant 103 may provide a batch file representing all of the accumulated transactions to be settled at that time to merchant processor 104, as indicated by arrow 114. For example, a transmission may occur when a predetermined threshold is reached. Merchant processor 104 may use the information in the batch file to create one or more batch files each containing transactions associated with respective card association 105. For example, merchant processor 104 may create a batch file for all Visa® credit card transactions from a plurality of merchants and transmit that batch file to Visa® as card association 105. As indicated by arrow 115, merchant processor 104 may provide the batch file to respective card association 105. Card association 105 may in turn use the batch file to create one or more batch files each containing transactions associated with respective card issuer 106. For example, Visa® may create a batch file for all transactions involving Visa® credit cards issued by a particular bank from a plurality of merchant processors and transmit that batch file to the bank as card issuer 106. As indicated by arrow 116, card association 105 may provide the batch file to respective card issuer 106.

It should be recognized that although only one card association 105 and one card issuer 106 are shown in FIG. 1, merchant processor 104 may provide a plurality of batch files to a plurality of respective card associations and the plurality of card associations may provide a plurality of batch files to a plurality of respective card issuers, as discussed herein.

In various exemplary embodiments, card issuer 106 may again determine whether customer 101 has requested any authorizations or restrictions that might apply to any of the pending transactions. For example, customer 101 may have made a request after authorization but before settlement. In various exemplary embodiments, if customer 101 requested a restriction that would apply to a transaction currently designated for settlement, card issuer 106 may respond by notifying merchant 103, merchant processor 104, and/or card association 105 that settlement could not be completed and the reason(s) for the denial. If, however, there is no restriction that would apply to a transaction designated for settlement, or customer 101 requested an authorization that would apply to the transaction, card issuer 106 may route funds for all transactions contained in a respective batch file to respective card association 105, as indicated by arrow 117.

As indicated by arrow 118, card association 105 may relay the funds to merchant processor 104 or, for example, combine them with any other funds before providing them to merchant processor 104. In various exemplary embodiments, as indicated by arrow 119, merchant processor 104 may route the funds to merchant 103 by, for example, depositing the funds into an account held on behalf of merchant 103. For example, merchant processor 104 may route funds electronically via a funds file through the Automated Clearing House (ACH) Network. Also, card issuer 106 and/or card association 105 may route funds for the associated transactions directly to an account held on behalf of merchant 103 rather than routing the funds through the other entities depicted in FIG. 1.

Customer 101 may later pay card issuer 106 that holds his or her account for the transactions that customer 101 makes. For example, customer 101 may pay a monthly bill to card issuer 106 and may choose to pay the full amount or only a partial amount of the bill. Card issuer 106 may charge customer 101 interest on any unpaid portion of a bill.

In various exemplary embodiments, the entities described in reference to system 100, such as, for example, merchant processor 104, card association 105, and card issuer 106, may charge various entities a fee for using their services. For example, card issuer 106 may charge customer 101 a fee for authorizing or restricting certain transactions via the user interface described herein. Also, merchant processor 104 may charge merchant 103 a predetermined percentage for each transaction (e.g., 2%) and reduce the amount paid to merchant 103 accordingly. Merchant processor 104 may also, for example, pay card association 105 and/or card issuer 106 for using their services (e.g., 1.4% interchange fee). Also, any of the entities described in reference to system 100 may charge a fee to any other entity for communicating or routing funds through the charging entity via a network.

FIGS. 2, 3, and 4 depict an exemplary user interface 200 for authorizing card account transactions by geographic region according to various embodiments of the disclosure. In various exemplary embodiments, user interface 200 may be presented to the customer in the form of a graphical web page with interactive functionality such that the customer may view, select, move, and/or drag-and-drop particular items on the page using a computer mouse to thereby instruct the card issuer what geographic regions, merchants, and merchant locations the customer desires to authorize and restrict for any particular account. The user interface 200 may comprise a title bar 201, a zoom control 202, an account information box 203, a map image 204, and an option selector 205.

Account information box 203 may display information for the account currently in use. An input mechanism, such as a drop-down menu or separate window, may allow the customer to choose which account should be displayed. Also, the customer may select among a family of cards each associated with a particular account identifier and thereby request authorizations and restrictions for specific cards (e.g., where a family has multiple cards for the same account).

Map image 204 may display an image of one or more geographic regions at a particular level of granularity, such as a street, neighborhood, zip code, county, state, province, country, or continent. FIG. 2, for example, displays an image of Europe at the continent level, while FIG. 3 displays an image of the United States at the country level and FIG. 4 displays an image of a particular neighborhood at the neighborhood level. The customer may switch between the various views by clicking the customer's mouse on different levels or dragging a slider in zoom control 202. The level of the current display may be shown by an emphasized bar in zoom control 202. The customer may also interactively move the map in various ways. For example, the customer may click his or her computer mouse on a particular portion of map image 204 and drag the mouse to the left, which may interactively move map image 204 to the left to view a previously unseen portion of the map.

Option selector 205 may be used to perform various functions associated with user interface 200. For example, the customer may click on the "Restrict" option and then click on a particular geographic region in map image 204. The customer may also drag a "Restrict" icon from option selector 205 to map image 204 and drop the icon onto a particular geographic region. User interface 200 may also show an indication of the currently selected option, such as temporarily changing the mouse cursor to an "X," for example, when the customer has selected the "Restrict" option. A similar process may be followed for the "Authorize" option.

Upon clicking on a particular geographic region or merchant location and selecting an option to restrict or authorize transactions, user interface 200 may display a popup, separate window, or other input mechanism whereby the customer may input parameters for the restriction or authorization, such as starting and ending dates, transaction types, or transaction amounts, as described herein. User interface 200 may receive such input (e.g., mouse input, keyboard input) from the customer and cause it to be provided electronically to the card issuer or other entity that provides user interface 200.

User interface 200 may also display geographic regions where the customer has authorized transactions using his or her account to take place, as well as geographic regions where the customer desires transactions to be restricted. For example, authorized regions may be displayed in a different color than restricted regions. Geographic regions where individual merchant locations have been authorized or restricted may also be displayed in yet another color or with a different indication. As depicted in FIG. 2, map image 204 shows three selected countries that the customer may have selected for restriction: Ireland, Portugal, and Switzerland. As depicted in FIG. 3, map image 204 shows four selected states that may have been selected for restriction: North Dakota, Okla., Michigan, and Maine.

At a lower level in zoom control 202, such as the neighborhood level depicted in map image 204 in FIG. 4, user interface 200 may display streets and merchant locations, as well as landmarks like landmark 404 that allow the customer to easily recognize a particular geographic region (e.g., the customer's home neighborhood). For example, street 401 labeled "Main Street" may be an accurate representation of the actual Main Street in a particular neighborhood. As described herein, the card issuer may build map image 204 by compiling a database of possible merchant locations and associating them with cartographic information. The merchant locations may be displayed, for example, as either a restricted merchant location indicator 402 with an "X" square or an authorized merchant location indicator 403 with a blank square so that the customer may be able to easily tell which merchant locations he or she has authorized and which merchant locations he or she has restricted. Also, by displaying all possible merchant locations where the customer may use his or her card, the card issuer provides valuable information to the customer, which may encourage the customer to shop at those locations. In some cases, map image 204 may display many merchant locations at the same time, such as in shopping center 406.

To further assist the customer in finding a particular named merchant location in map image 204, a popup may be displayed for each merchant location whenever the customer clicks on or moves his or her mouse pointer over the respective indicator. When the customer clicks on authorized merchant location indicator 407, for example, popup 405 may appear and display information about the merchant location "ABC Store" at "11 Main St.," such as a name, address, phone number, web site hyperlink, and statement regarding what restrictions have been placed on the merchant location (if any). If the "ABC Store" at "11 Main St." had a restriction placed on it by the customer, the parameters of that restriction may be displayed in popup 405. A popup may also contain an input field where the customer may input any parameters for restriction or authorization, such as starting and ending dates, transaction types, or transaction amounts, as described herein.

User interface 200 may also allow the customer to authorize or restrict transactions with a merchant (e.g., Wal-Mart®) at all locations for that merchant. For example, when the customer clicks on one location for the respective merchant, a popup may ask the customer if he or she wants to restrict all locations or just the selected location. Also, user interface 200 may provide a link to a separate web page for entering information for authorizing or restricting all transactions with a merchant, for example.

User interface 200 may also display a movement control 206 at the level depicted in FIG. 4, which may be selected with the computer mouse or moved in different directions to make map image 204 move interactively. Movement control 206 may make user interface 200 easier to navigate at the lowest levels of granularity.

User interface 200 may also allow the customer to set alerts for certain events, which may be specified by either the customer, the card issuer providing user interface 200, or another entity. For example, the customer may click on the "Set Alerts" option in option selector 205, which may open a drop-down menu on user interface 200 or open a separate window where the user may choose a particular type of alert. For example, the customer may choose to receive an e-mail whenever a transaction at a particular merchant location is attempted and denied, or the customer may choose to receive an alert whenever a transaction is completed in a specific geographic region. Also, the customer may want the card issuer to notify the appropriate authorities whenever a transaction is denied as restricted. It will be recognized by those of skill in the art that alerts may be made in any number of ways, including, for example, a telephone message, fax message, e-mail, text message, or instant message, and may be sent to the customer or to any other individual or entity. Also, a card issuer 106 may alert a customer who is not registered to use user interface 200 when an unusual charge is made on the customer's account and provide a mechanism for the customer to access user interface 200 and prohibit such transactions in the future.

In various exemplary embodiments, the customer may also be alerted whenever he or she enters a geographic region or arrives at a merchant location that has an existing authorization or restriction. It will be understood that there may be many ways in which the customer's current physical location may be determined, such as, for example, Global Positioning Systems (GPS) and SIM cards in wireless/mobile devices. For example, the customer may have restricted transactions in New York City but later forgotten to deactivate the restriction when he or she traveled there; the customer may then be alerted (e.g., on his or her wireless/mobile device) before he or she attempts to make a purchase. Likewise, a customer may provide his or her current physical location to a card issuer via a wireless/mobile device to authorize or restrict transactions in that geographic region.

User interface 200 may also link to other systems to allow a customer added functionality. For example, a customer may decide to restrict transactions at a particular merchant location because of past fraudulent charges at that location. User interface 200 may then provide a link to another user interface or system where the customer may dispute the charge and/or alert his or her card issuer to the problem. Also, a customer may be offered additional products through user interface 200, such as credit accounts or loans, based on the customer's "default" home region (e.g., state, zip code), geographic region in which the customer regularly does business, or current authorizations and restrictions. In that way, the customer may receive an enhanced experience interacting with user interface 200.

In various exemplary embodiments, user interface 200 may also allow the customer to exit user interface 200 by, for example, clicking the "Logout" option in option selector 205. User interface 205 may then, for example, redirect the user's web browser to another web page and delete information associated with the customer from the customer's computer to ensure the customer's security.

It will also be understood that user interface 200 need not be a graphical user interface and may comprise any mechanism for communicating with and receiving input information from a customer. For example, user interface 200 may be a Voice Response Unit ("VRU") for interactive voice response where a customer may provide zip code geographic regions by typing numbers on a keypad or may select among a set of merchant locations by selecting a numerical choice on a keypad.

FIG. 5 depicts an exemplary database table for use in authorizing card account transactions by geographic region according to various embodiments of the disclosure. In reference to FIG. 5, the card issuer may have received a request to restrict transactions in a particular geographic region or at a particular merchant or merchant location and populated an authorization and restriction table 500, which may be stored electronically in a database. The card issuer may later refer to authorization and restriction table 500 to determine whether a desired transaction should be allowed or denied during the authorization and/or settlement phases of a pending transaction, as described herein. Authorization and restriction table 500 may comprise entries 516-519 for particular customer requests, wherein each is given an entry number 501. For example, entry 516 may correspond to a request by the customer "John Doe." Each entry may comprise information associated with a particular request and the customer making the request, such as customer name 502, customer address 503, customer phone number 504, customer e-mail address 505, customer region identifier 506, account type 507, account number 508, expiration date 509, card association 510, status 511 (e.g "Restricted" or "Allowed"), region identifier 512 for a restricted or authorized geographic region (if the request is related to a particular geographic region), merchant identifier 513 for a restricted or authorized merchant or merchant location (if the request is related to a particular merchant or merchant location), begin time 514 for beginning the restriction or authorization, end time 515 for ending the restriction or authorization, and instructions 516 for performing the restriction or authorization. As described herein, when a customer makes a restriction request, an existing entry may be changed from "Authorized" to "Restricted" status, or, if there is no current entry relating to the chosen geographic region or merchant location and the "default" status is "Authorized," a new entry may be created with "Restricted" status. A similar process may also be performed for authorizations, vice versa. The status of a particular geographic region or merchant location if no corresponding entry is present may be assumed according to the "default" setting currently in effect.

Regional identifier 511 may correspond to a specific geographic region, such as a street, neighborhood, zip code, county, state, province, country, or continent, in a hierarchical fashion such that multiple streets may be within one neighborhood, multiple neighborhoods may be within one zip code, multiple zip codes may be within one county, etc. It will be recognized by those of skill in the art that there may be many ways to organize data hierarchically in a database or other storage mechanism. Merchant identifier 512 may likewise correspond to multiple items of information, such as a specific merchant or merchant location, as well as a particular regional identifier where that merchant location is situated. Separate databases may also be maintained for authorization requests and restriction requests, respectively.

When an incoming transaction is submitted for authorization, the card issuer may attempt to match the account number used for the transaction to an account number stored in authorization and restriction table 500. If one or more matches are found, the card issuer may determine whether the restriction(s) in the table prohibit the desired transaction (e.g., if a geographic region where the transaction is being attempted corresponds to a "restricted" geographic region database entry). If so, the card issuer may deny the transaction. If not, the card issuer may allow the transaction. Likewise, if no matches are found, the card issuer may allow the transaction. It will also be recognized that information associated with a customer request for authorization or restriction may be stored in any storage mechanism with any amount of fields or types of fields, not just the table in an electronic database described in reference to FIG. 5.

Figure 6:
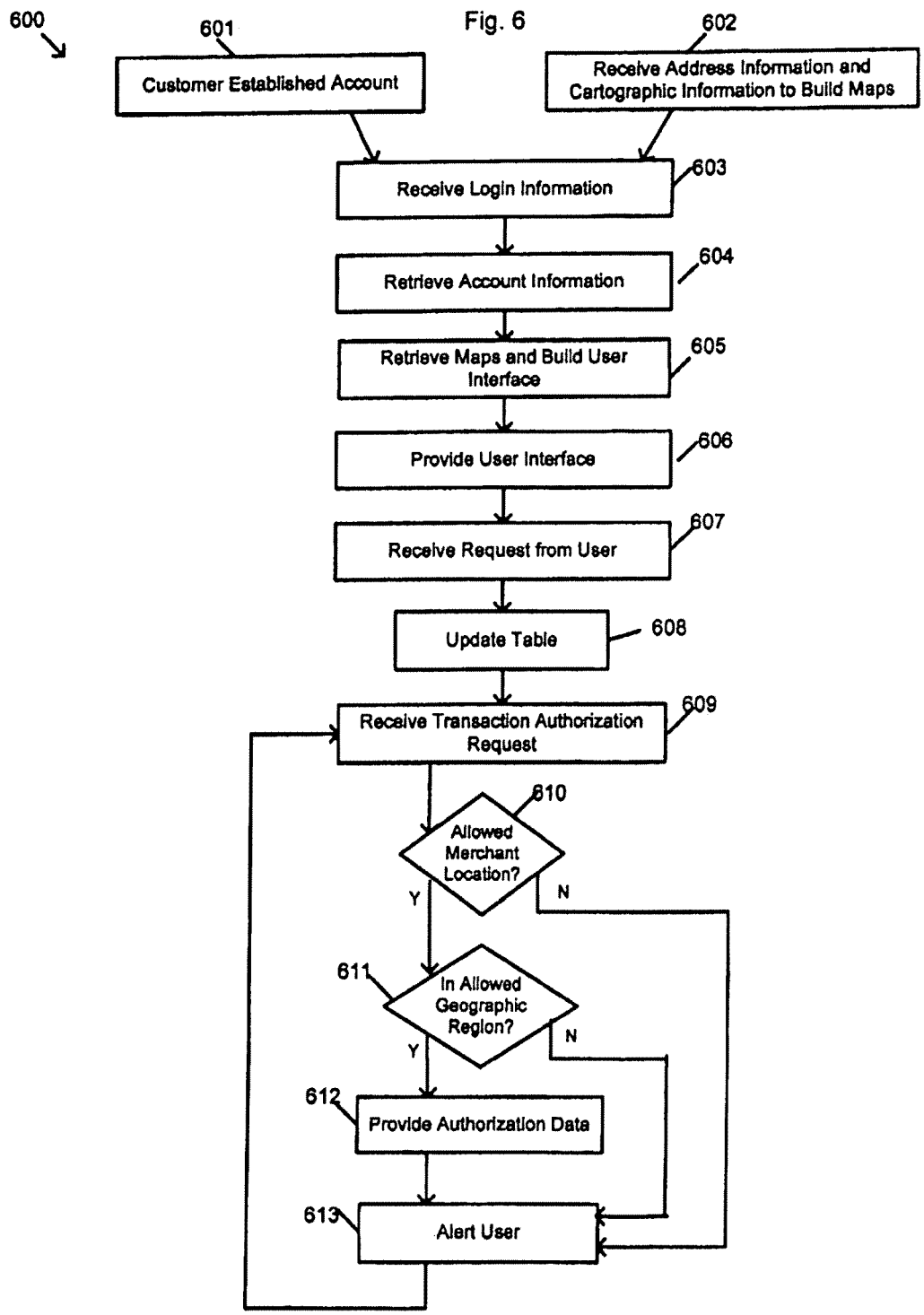
FIG. 6 depicts a flow chart which illustrates an exemplary method for authorizing card account transactions by geographic region according to various embodiments of the disclosure.

FIG. 6 depicts an exemplary flow chart 600 which illustrates an exemplary method for authorizing card account transactions by geographic region according to various embodiments of the disclosure. At block 601, a customer may establish an account, such as a credit account, with a card issuer and receive a corresponding card to be used in making purchases and conducting other financial transactions. At block 602, the card issuer may receive address information for a plurality of merchant locations from a supplying entity, such as a card association or merchant processor, as described herein. The card issuer may use the address information to populate a database of potential merchants and merchant locations where the customer may use his or her card. As described herein, the card issuer may also generate a set of map images from cartographic information for geographic regions throughout the world (or which may be supplied by any information provider) and integrate the potential merchant locations for later displaying in a user interface, as described herein.

At block 603, the card issuer may receive login information for a particular customer and/or account. For example, a customer may enter a user name and password on a secure web page to gain access to the card issuer's system and then enter an account identifier associated with an account for which the customer desires to make a request. At block 604, the card issuer may retrieve account information for the customer's account, such as account type, balance, and current authorizations and restrictions for the account. At block 605, the card issuer may retrieve a set of map images for geographic regions that the customer may wish to view and generate a user interface comprising those maps with integrated merchant location indicators, as described in reference to FIGS. 2, 3, and 4. The card issuer may then provide the user interface to the customer at block 606 by, for example, transmitting data for generating a web page on a web browser. At block 607, the card issuer may receive a request submitted by the user for a particular restriction or authorization. For example, the customer may request that all transactions with merchants in Europe be denied. The card issuer may then at block 608 update a table, such as authorization and restriction table 500 in FIG. 5, by changing status information according to the received request (e.g., to "authorized" or "restricted").

At block 609, the card issuer may at some point in time receive an authorization request for a particular transaction involving the customer's account. For example, someone may have attempted to use the customer's card in Europe to purchase a particular item or withdraw money at an ATM. If the customer previously submitted a request to restrict all transactions in Europe, however, the transaction may be denied. At block 610, the card issuer may verify that the attempted transaction is in an allowed geographic region (e.g., whether it is in an "allowed" or "restricted" geographic region at various hierarchical levels). If not, the card issuer may deny the transaction at block 612 and alert the user (or, for example, the authorities or a fraud alert service) of the potentially fraudulent activity at block 613. If there was no restriction placed on the geographic region where the attempted transaction took place, however, the card issuer may at block 611 proceed to determine if the transaction was initiated at an allowed merchant location (e.g., whether it is at an "allowed" or "restricted" merchant location). If not, the card issuer may likewise deny the transaction at block 612 and alert the user accordingly at block 613. If there was no restriction placed on the merchant location where the attempted transaction took place, however, the card issuer may authorize the transaction at block 612 by, for example, providing an authorization message to a card association, as described herein, and alert the user that the transaction succeeded at block 613 (if the user has chosen to receive such alerts). The card issuer may then proceed to wait for the next transaction authorization request at block 609.

FIG. 7 depicts an exemplary system for authorizing card account transactions by geographic region according to various embodiments of the disclosure. Card issuer 106 may include one or more of the following modules: a communication module 703, an interface module 704, a processing module 705, a user interface communication module 707, an adjustment module 708, a transaction processing module 709, an authorization module 710, an address information receipt module 711, and a database module 712. One or more of the modules may electronically communicate with each other and/or other entities, such as, for example, merchant processor 104, merchant 103, customer 101, card association 105, or any other entity over an external network 701, via a communication mechanism 702, such as a data communication bus or one or more networks as defined herein. The modules may also communicate with a storage mechanism 706, as described herein. The modules described in reference to FIG. 7 may each be an appropriately programmed computer, such as a mainframe or personal computer, or may include a plurality of such computers cooperating to perform the functionality described herein.

Address information receipt module 711 may receive address information for merchant locations (e.g., names, addresses, geographic regions), as described herein. Database module 712 may then use that information, along with cartographic information, to populate a database in storage mechanism 706, as described herein. Communication module 703 may receive account information associated with a card account held by a user, such as an account number, for example. Interface module 704 may provide data for a user interface, such as the user interface depicted in FIGS. 2, 3, and 4. Interface module 704 may retrieve and/or generate such data from data stored in storage mechanism 708, such as address information for merchant locations, cartographic information, and/or tables like the table depicted in FIG. 5, for example. Processing module 705 may then determine a status for any particular geographic regions or merchant locations (e.g., authorized, restricted, or no status, which may indicate either authorized or restricted depending on a default setting, as described herein).

User interface communication module 707 may receive a user interface selection representing a request to authorize or restrict transactions in a selected geographic region or at a selected merchant location. The customer may select such a geographic region or merchant location by interacting with the user interface in the various ways described herein and may also select parameters for authorization or restriction (e.g., starting and ending dates, transaction types, or transaction amounts). Adjustment module 708 may then adjust the status of a selected geographic region or merchant location (e.g., to "authorized" or "restricted" and set parameters) stored in the storage mechanism 706, for example. Transaction processing module 709 may receive authorization requests for desired transactions using the card account. If a desired transaction corresponds to a restriction for the account, authorization module 710 may deny the attempted transaction. If a desired transaction does not correspond to any restriction, or corresponds to an authorization, authorization module 710 may allow the attempted transaction. For example, authorization module 710 may provide an authorization message to various entities involved in authorization and/or settlement of financial transactions, as described herein.

The present invention provides added security for customers who use card accounts, particularly those who use card accounts regularly and may therefore be more susceptible to identity theft. For example, by prohibiting transactions in geographic regions or at merchant locations where the customer knows he or she will never transact business, the potential for fraudulent use of the customer's account may be significantly reduced. The customer may also avoid paying for fraudulent charges that he or she may otherwise be forced to pay when an identity thief uses his or her card illegally. In that way, the customer may feel a sense of added security knowing that unauthorized transactions will not occur (or are at least much more unlikely). Law enforcement may also benefit by being notified of fraudulent charges when a particular transaction is denied due to a customer-provided restriction.

By offering customers such added protection, the present invention also encourages loyalty to the entity that allows its customers to authorize and restrict particular transactions. For example, a card issuer may give its customers a significant advantage over other providers that do not allow the same functionality and thereby encourage its customers to open more accounts at the card issuer, which may increase the card issuer's business. A card issuer may also avoid charges associated with paying for fraudulent usage of its customer's card accounts and may pass along those cost savings to its customers and thereby generate more business.

The embodiments of the present invention are not to be limited in scope by the specific embodiments described herein. For example, the user interface may be in any format, including a VRU interface. Or, the user interface may display any image or combination of images. Or, addresses of potential merchant locations may be obtained from any entity possessing that information, including a card association, merchant processor, or individual merchants themselves. Or, address information may be collected in any storage mechanism and combined with cartographic information obtained from any source. Or, information regarding a customer's authorizations and restrictions may be provided to any entity upon receipt, at the time of an authorized or restricted transaction, periodically in batches, or in any other time interval. Or, an authorization request, authorization message, and batch files created and provided in the course of a transaction may be in any form to permit authorization and settlement of a transaction. Or, the merchant may be located remotely from the customer and accessible to the customer via, for example, the telephone or one or more networks. Or, the system for authorizing card account transactions by geographic region may be a collection of more than one computer, each operating collectively as the system. Or, the system may be automated such that authorizing card account transactions by geographic region does not require interaction with an operator or a user.

Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A method for authorizing transactions, the method comprising:
providing initial authorization settings corresponding to an initial authorization status for each of a plurality of automated teller machine (ATM) locations, the initial authorization status indicating whether a financial account is usable or accessible at each of the plurality of ATM locations for completing a transaction;
transmitting, to a computing device, user interface data such that the computing device is enabled to display a user interface displaying indications of the plurality of ATM locations and a plurality of geographic regions;
receiving, from the computing device and via the user interface, a request to adjust the initial authorization status for a selected ATM location or a selected geographic region;
changing the initial authorization settings to adjusted authorization settings, the adjusted authorization settings including an adjusted authorization status corresponding to the selected ATM location or the selected geographic region;
receiving an authorization request for a transaction associated with the financial account; and
determining, based on the adjusted authorization settings, whether the requested transaction is authorized.

2. The method of claim 1, wherein:
if the initial authorization status is a restricted status, the adjusted authorization status is an allowed status, and
if the initial authorization status is an allowed status, the adjusted authorization status is a restricted status.

3. The method of claim 1, wherein determining whether the requested transaction is authorized comprises determining that the requested transaction is authorized if the adjusted authorization settings authorize transactions involving a transaction ATM location or a transaction geographic region associated with the requested transaction.

4. The method of claim 1, wherein determining whether the requested transaction is authorized comprises determining that the requested transaction is not authorized if the adjusted authorization settings restrict transactions to a transaction ATM location or a transaction geographic region associated with the requested transaction.

5. The method of claim 1, wherein the user interface data includes map display data such that the computing device is enabled to display an indication of at least one of the plurality of ATM locations or at least one of the plurality of geographic regions.

6. The method of claim 5 further comprising:
receiving address information for each of the at least one of the plurality of ATM locations; and
storing cartographic information and the received address information in a cartographic database,
wherein the map display data comprises the cartographic information and the received address information.

7. The method of claim 1 further comprising:
storing, at a memory location, ATM data comprising an ATM location for each of a plurality of ATMs;
responsive to receiving the authorization request for the requested transaction, identifying a requesting ATM location of a requesting ATM associated with the requested transaction;
determining that the ATM data does not include the requesting ATM location for the requesting ATM; and
appending, to the ATM data and at the memory location, the requesting ATM location.

8. The method of claim 7 further comprising providing the initial authorization status for the requesting ATM location.

9. The method of claim 1, wherein the adjusted authorization status for the selected ATM location or the selected geographic region restricts transactions having a transaction value within a range of restricted transaction values.

10. The method of claim 1, wherein the adjusted authorization status for the selected ATM location or the selected geographic region restricts transactions initiated during a restricted time period.

11. The method of claim 1, wherein the adjusted authorization status for the selected ATM location or the selected geographic region restricts transactions of a restricted type.

12. The method of claim 1, wherein a plurality of payment cards is associated with the financial account, each payment card of the plurality of payment cards having independently adjustable initial authorization settings corresponding to the initial authorization status for the plurality of ATM locations, the initial authorization status indicating whether the plurality of ATM locations is authorized to transact with the corresponding payment card of the financial account.

13. The method of claim 1 further comprising, prior to changing the initial authorization settings to the adjusted authorization settings, requesting authentication information indicative of an identity of a user associated with the financial account.

14. A method for authorizing transactions, the method comprising:
associating one or more first authorization statuses with one or more automated teller machine (ATM) locations or one or more geographic regions, the one or more first authorization statuses indicating whether a financial account is usable for completing a transaction at the one or more ATM locations or an ATM location located within the one or more geographic regions;

receiving, from a computing device associated with a user of the financial account, a request to replace the one or more first authorization statuses with one or more second authorization statuses, the one or more second authorization statuses being different from the one or more first authorization statuses;

replacing the one or more first authorization statuses with the one or more second authorization statuses;

receiving an authorization request for an ATM transaction associated with the financial account; and determining, based on the one or more second authorization statuses, whether the requested ATM transaction is authorized.

15. The method of claim 14 further comprising transmitting, to a law enforcement authority or an institution associated with the authorization request, a notification indicating that a restricted transaction was attempted.

16. The method of claim 14 further comprising transmitting, to the computing device associated with the user, a notification indicating that a restricted transaction was attempted.

17. The method of claim 16 further comprising:

receiving, from the computing device associated with the user, a request to override a restriction to the restricted transaction; and determining, based on the requested to override the restriction, that the requested transaction is authorized.

18. The method of claim 14 further comprising, responsive to determining that the requested ATM transaction from a particular ATM location or an ATM location in a particular geographic region is not authorized, transmitting an alert to the computing device associated with the user.

19. The method of claim 14 further comprising, responsive to determining that the computing device associated with the user enters a particular geographic region or arrives at a particular ATM location, transmitting an alert to the computing device.

20. A system for identifying an authorized transaction, the system comprising:

one or more processors; and memory storing instructions that, when executed by the one or more processors, cause the system to:

provide first authorization settings corresponding to an authorized status for an automated teller machine (ATM) at a particular ATM location;

receive, from a computing device associated with a customer, second authorization settings corresponding to a restricted status for the ATM; and subsequent to receiving the second authorization settings:

receive, from the ATM, a request to authorize a transaction associated with a customer financial account associated with the customer;

determine, based on the second authorization settings, that the transaction is restricted; and transmit, to the ATM, a notification indicating that the transaction could not be completed.

* * * * *